USE005709914A

United States Patent [19]

Hayes

[11] Patent Number: 5,709,914
[45] Date of Patent: Jan. 20, 1998

[54] THERMAL STORAGE AND TRANSFER DEVICE

[76] Inventor: Claude Q. C. Hayes, 3737 Third Ave., #308, San Diego, Calif. 92103

[21] Appl. No.: 811,106

[22] Filed: Mar. 3, 1997

Related U.S. Application Data

[63] Continuation of Ser. No. 183,199, Jan. 18, 1994, abandoned.

[51] Int. Cl.⁶ .................... B65B 53/00; B29D 22/00; B32B 1/08
[52] U.S. Cl. .................... 428/35.1; 428/35.7; 428/36.1; 428/36.5; 428/109; 428/224; 428/283; 428/284; 428/409
[58] Field of Search .................. 428/35.1, 35.7, 428/36.1, 36.5, 109, 224, 283, 284, 409

[56] References Cited

U.S. PATENT DOCUMENTS

| 4,446,916 | 5/1984 | Hayes | 165/185 |
| 4,632,865 | 12/1986 | Tzur | 428/304.4 |
| 4,694,119 | 9/1987 | Groenewegen | 174/52 PE |

Primary Examiner—Joseph L. Schofer
Assistant Examiner—Kathryne E. Shelborne
Attorney, Agent, or Firm—Bauer & Schaffer

[57] ABSTRACT

A selected endothermic agent having a heat of reaction is embedded within an absorbent supporting open cell network matrix. The matrix is capable of being shaped into a form retaining body for the controlled transfer of heat by radiation, convection, and conduction.

20 Claims, 1 Drawing Sheet

THERMAL STORAGE AND TRANSFER DEVICE

This is a continuation of application Ser. No. 08/183,199, filed Jan. 18, 1994, now abandoned.

BACKGROUND OF THE INVENTION

The present invention relates to composite fabric endothermic materials and the method for constructing the same.

Endothermic devices suitable for the transfer and/or storage of heat or cold are known. Generally, such devices employ phase change material compositions (PCM's). The conventional PCM materials are largely solid or fluidic in nature being on the one hand a liquid, quasi-liquid, or solid such as a wax or other meltable. Over time, the conventional PCM's have proven to suffer from many technical and applications problems. These problems include the inability to control the shape and form of such fluid PCM materials as well as the evenness of heating and cooling. Other problems are the need to provide a containment housing and the stress placed on the housing resulting in frequent rupture and spillage of the PCM; the hazard to life and property due to PCM's high heat content and flammability; and lastly, the uneven heating or cooling hysteresis. For these critical reasons and others, PCM's as thermal storage mediums have a long history of failure and non-use in commercial and military applications.

In applicant's patent, U.S. Pat. No. 4,446,916, applicant has disclosed what he calls a composite fabric endothermic material (CFEM), providing devices especially suitable as heat sinks for aerospace and military use. The patented CFEM provides an improved heat sink that absorbs heat at the melting temperatures of a compound embedded within a fibrous mesh or matrix. The compound preferably comprises a phase change material which is held by capillary action to the fibers of the matrix. As a result a greatly increased surface area for heat transfer is obtained.

The normal PCM's can spill hot fluids onto a human's skin, resulting in serious third degree burns due to the sticky contact nature of many hot wax and plastic phase change material and the high heat and sticky adherence to skin. Ruptured non CFEM or liquified wax PCM disk spill their content and cause flash fires which spread as the PCM pours out during heating in ovens. Wax filled disks are prone to fires, which can spread and flow out of stoves but CFEM fabric absorbs and contains liquid PCM making it difficult to ignite.

While the patented CFEM is eminently suitable for use in military applications, it is not suitable for use in many commercial and civilian applications, particularly for food, home and commercial packaging operations.

It is, therefore, the object of the present invention to provide an improved CFEM capable of being employed in a variety of commercial applications such as in the food industry where a need has arisen for heat retaining or heat insulating containers, packages and thermal storage devices. Such applications require quick absorption and controlled transfer of heat, homogenous heating, a latent heat of reaction or fusion at relatively high temperatures, and control of fire hazard and chemical nontoxicity. Similar needs are found in other civilian and commercial fields including heat storage for drum drying devices in heat-set printing, home temperature and environmental control, thermal storage for electrothermal devices and related technologies. Other applications including holding hot food and collection and storage of excess heat from boilers and solar heating devices.

It is a particular object of the present invention to provide endothermic agents of relative high latent heat of fusion at temperatures below 500° F. that their use in lieu of wax or paraffin-based compositions is not obvious or even possible in some applications.

It is another object of the present invention to provide endothermic mechanisms which make use of chemical reactions other than latent heat of fusion such as:

1. Absorption of the latent heat of fusion ($\Delta H_f$);
2. Absorption of the latent heat of hydration ($\Delta H_h$);
3. Absorption of the latent heat of formation and decomposition ($\Delta H_d$);
4. Absorption of the latent heat of vaporization and sublimation ($\Delta H_v$);
5. Absorption of the change in heat of enthalpy ($\Delta H_e$); and
6. Reduction reaction chemistry ($\Delta H_r$).

It is another object to provide a matrix structure which will retain the endothermic agent above and below the melting point, to modify the rate of thermal conductivity of the agent, and provides a means for retaining and conforming the shape of the endothermic agent to its exterior housing or container.

These objects, as well as others, will be found in detail in the following disclosure.

DESCRIPTION OF THE INVENTION

Figure 1:
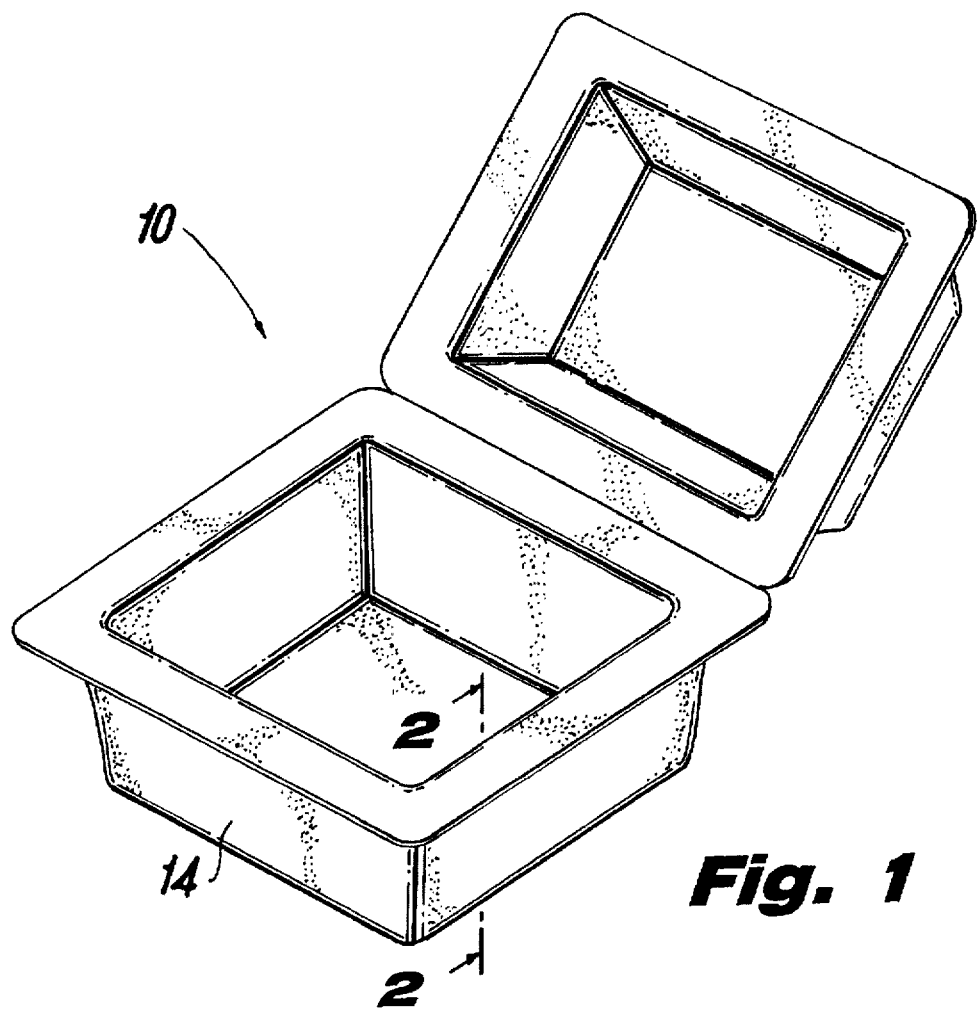
FIG. 1 is a perspective view of a device constructed in accord with the present invention.
Figure 2:
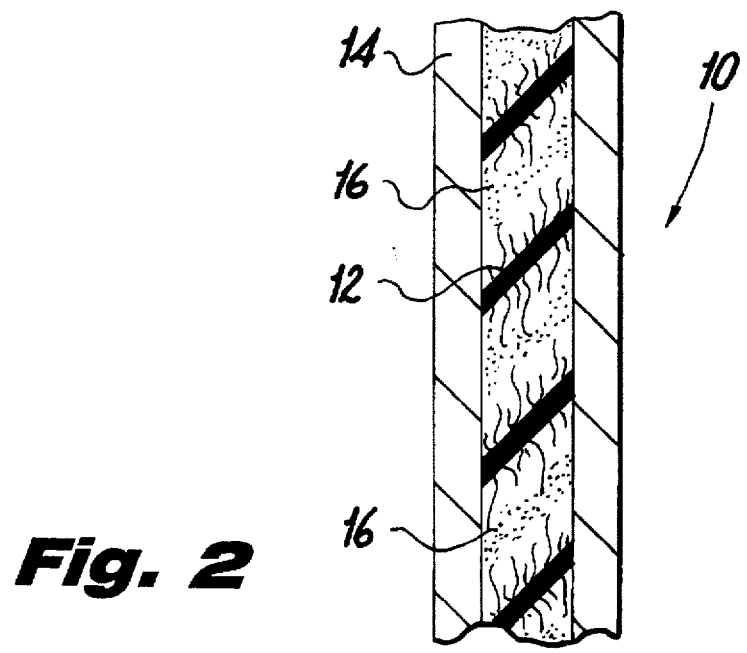
FIG. 2 is an enlarged sectional view taken along line 2—2.

As seen in FIG. 1, a food container illustrating the use to which the present invention may be put is shown. The container, generally depicted by the numeral 10, comprises a fibrous matrix core 12 molded or formed to conform to an outer supporting rigid wall 14. Embedded within the matrix 12, as by adhesion, absorption, chemical bonding or the like is an endothermic agent 16 of the type set forth below.

The PCM endothermic agents may be selected from polymers, homopolymers, oxidized polymers, oxidized homopolymers of ethylene compounds, and carbon monoxide bonded copolymers, micronized polyethylene waxes, including: N,N ethylenebisstearamide, ethylenebisstearamide, tars, heavy oils and hydrocarbons, polyvinyl alcohols, ethylenebahamide, polyethylene homopolymers (oxidized or not) carnauba wax and eutectic blends of any of these materials or families of material including salts with melting points below 550°.

For microwave applications the endothermic agent may comprise a water based gel or carbon monoxide copolymer.

These endothermic agents were specifically selected because they either specifically contain compounds or families of compounds or are applicable compounds themselves or can form blends of chemicals which have melting points between 135° F. and 326° F., which is highly suitable for use with hot food holding. They also exhibit latent heats of fusion above 50 cal/gm and may be as high as 200 cal/gm. The higher the latent heat of fusion the less the mass of material necessary to store the heat. Another characteristic of these substances is that many of them are FDA (Federal Drug Administration) approved for some form of use or contact with or near to food or for use with devices used with food. These endothermic agents cool by chemical reaction, chemical decomposition enthalpy, hydration and/or sublimation.

These chemicals have 2 to 3 times as much thermal storage capacity (latent heat of fusion) as some of the paraffin based waxes presently and extensively used in the industry, and are compatible with plastics wherein most waxes are not. They are also capable of being cycled in use and have high temperatures of decomposition and high flash points.

The matrix is formed of an open cell network, i.e. mesh, powders, solid forms, fibrous batting, wad of closely bound material or fibers, strips of clumped metal, plastic or sheets. By open network it is intended to mean a body of material having increased internal surface area and at least some completely surface to surface openings, pores, interstices or passageways for convection current and spread of a liquid PCM or endothermic agent between the surfaces of the matrix.

The matrix 12 may be formed from fabric, cloth, metal mesh, batting, fiberglass, fiber, dust particles, powder, carbon foam, silica foam, metal foam, hollow particles, KEVLAR an aromatic polyester fiber manufactured by the Dupont Company, fiber, clay, aluminum, copper, perforated metal foils, cellulose material and microspheres. Preferably, the matrix 12 is made of a material capable of being molded or layered or otherwise formed into a desired shape, for example, teflon, KEVLAR, Copper mesh, graphite fiber or the like. On the other hand, paper or aluminum, in sheets, foil or strips can be formed into shape so that it will hold a fibrous fabric or batting within it. Various combinations of materials, shapes, and containers may be made. Open cell ceramic materials may also be used, as well as foamed or unfoamed plastics, polycarbonate and polysulfonates plastic may be used for external housing or matrix formation.

In one instance, a device was made of a teflon and fiberglass bag containing a metal mesh and cotton matrix impregnated with the inventive endothermic agent. Other devices may make use of batting material embedded in a perforated aluminum matrix and carriers. Devices in which metal particles are embedded in a fabric or batting matrix may also be used. The matrix may be in any form such as absorbent batting material, fibers and the like. It may be woven or cloth, or in the form of particles and shredded and chopped and powdered material as well as foam structures such as glass, carbon and metal where capillary action retains the endothermic agent and in which thermal conductivity can be controlled. A matrix made of copper mesh type 2a, diamond grit and chips, graphite powder and graphite fabric may also be formed. Though mentioned, these materials are probably too expensive at this time for commercial applications and are most appropriate for use in devices making use of latent heats of reaction, i.e. reduction reactions.

In addition to the polycarbonate and polysulfonates, others of the above materials, used to construct a plastic matrix, may also be employed to construct a rigid, form retaining outer housing in which the matrix is supported for use. It is, of course, preferable to form the outer housing and the matrix simultaneously when the individual materials are appropriately selected. This, of course, is not essential and there may be times when it will be preferable to form the matrix separately so that it may be easily removed from the outer container when necessary or desirable for replacement.

The thicker the matrix the more attention must be given to controlling the internal thermal conductivity of the CFEM heat sink endothermic material itself. For example, a single layer 15" sq. Kevlar batting pad having a 1/16" thickness will hold up to 300 grams of the endothermic agents disclosed above with densities near 1. The best materials for forming high thermal conductivity CFEM matrix materials are hollow open cell powders, foams or fibers such as metals carbon and fiberglass so that the endothermic agent may be encapsulated in the pores or voids absorbed by the material or adhered thereto by capillary or chemical bonding. To control the rate of heat transfer one may mix and match the materials as, for example, KEVLAR cotton batting may be employed in combination with aluminum, copper, or graphite fiber or fabric or ceramic microspheres, thereby obtaining a desired rate of internal thermal conductivity. A two-layer 15" sq. Kevlar pad having a 1/16" thickness will permit the storage of up to 600 gms of endothermic agent, but then internal thermal conductivity becomes more of a problem due to multiple layers or thickness of the device. Perforated aluminum foil layers, copper mesh, or powder of metal or other material suspended in the matrix may be used to enhance conductivity. The matrix enhances thermal conductivity by multiplying the surface area of the thermal conductor distributed throughout the device and in contact with the endothermic agent, for example a copper mesh 140 will give a 17 to 1 increase in conductive surface area than a single layer of copper material.

It should also be noted that a single layer CFEM device should be almost as cheaply produced as conventional non-CFEM device. A single layer CFEM would have-all of the technical and safety benefits of a conventional two-layer device but with less cost due to less labor necessary for its fabrication. It can be simply made by placing the endothermic agent on top of a single layer of matrix material, for example, KEVLAR batting or similar material without folding or layering. Since the endothermic agent binds with the matrix (here a single sheet) by capillary action, by chemical bonding or by simple polymeric adhesion multiple layers, laminate construction or open matrix construction, while desirable, is not absolutely required as long as the matrix can absorb and hold the endothermic agent.

Returning to the endothermic agents of the present invention, all of the above compounds are relatively inexpensive, commercially available and have high latent heats of fusion with melting points from well below 500° F. For these reasons, they are extraordinarily suitable for thermal storage relative to food and other commercial applications particularly when having a heat of reaction between 300° F. and 450° F. For home siding applications the endothermic agents are selected to have melting points from about 40° to 100° F. One especially promising application is to provide a device for use in lieu of the standard home insulation material or wall backing for siding, to obtain both winter and summer thermal control. Such material can be single sheet or layered and would be capable of being installed easily as underliners below exterior shingles or within the exterior walls. Traditional waxes used in the industry have melting points from 180°–210° F. maximum and seldom store more than 55 cal. per gram compared to the 80 to 200 cal. per gram available with the above compounds.

It is possible to build an effective thermal storage devices without a core carrier sheet or matrix if the endothermic agent were made of very thin layer so that it would represent a small thermal barrier to the heat flux of an oven. However, a thin unit without a matrix would have a very poor performance and would be limited in its heat storage capacity and applications. Thus, if the commercial application requires that the heating time of the device be extended from 1 hour to 2 or 3 hours, using the same structural dimensions, then the device would suffer from all of the traditional thermal barrier and technical problems typical of past PCM technology due to its increased thickness. On the other hand the ethylene polymers, including the copolymers, as disclosed herein, when used with plastics are superior to waxes as fusion, coolants or thermal storage mediums because they do not tend to soften the plastic or change its chemistry. They have relatively high latent heats of fusion and high decomposition temperatures relative to convection ovens and are FDA approved for contact with food.

Other advantages of the present technology include high specific heat, high latent heat of fusion, ease of eutectic blending, safety for food contact, high viscosity and high decomposition temperatures. The high viscosity aids in the retention of the agent in the matrix and the high decomposition temperature assures a long chemical life for the entire device. Polymers may be used with plastic containers where waxes may decompose or react with such plastics. Further, the endothermic agents in the matrix are easily shaped into desired forms such as boxes or containers and can be made to adhere to whatever material is used as the exterior wall or housing and make extremely good contact with the surface.

CFEM technology coupled with the present endothermic agents permits the user to easily and cheaply contour and configure a CFEM thermal storage device to fit any form, design or shape and to be enclosed in many different materials. Absorbent matrix prevents spillage in open enclosures and also provides for even and rapid temperature distribution between the inside center of the matrix and its outer heat exchange surface (quick heating times). The matrix allows for control of endothermic agent thermal conductivity, suppression of spillage and ignition, and permits the design of vented enclosures which avoid stress problems. A pressurized non-CFEM sealed heater using an organic or hydrocarbon (wax) PCM such as in the conventional devices will tend to deform the container above 320° F. and possibly explode above 350° when paraffin wax is used.

As a specific, but not limiting, example of the application to which the present invention may be employed, a suitable fibrous matrix (KEVLAR batting) employing a polyethylene polymer endothermic material embedded and sandwiched between two sheets of aluminum therein was shaped into a large disk for heating pizza and for eventual placement within a separately prepared and conventional cardboard box for hot pizza.

The device is placed within an oven for a time sufficient to permit the endothermic agent embedded in the matrix to absorb its heat. Thereafter, the disk is placed in the paperboard box or carton where the pizza is placed as well. Any conduction or convection oven may be used, although in this example, microwave ovens may be preferable. When a carbon monoxide copolymer or water based gels are the endothermic agents, they are easily responsive to heating by microwaves when in plastic cases.

The disk so made absorbs a quantity of heat proportional to the latent heat of fusion of the endothermic agent at the melting point or temperature of reaction, which heat is thereafter employed or transferred to the pizza. Heat transfer is made by radiation as well as conduction or convection from the disk to the food. Since the heat transfer occurs only when the temperature of the food falls below a specific level, the food can thus be maintained warm over a very long period of time. Since the food does not require reheating, its freshness in both appearance and taste is also maintained.

Additional uses of the present invention in other commercial food applications, including cups, plates and bowls which may store excess heat. Other applications include siding for homes and buildings which regulate temperature, clothing, camping gear, heat retention and thermal control for pipes and transport vehicles, cooling or heating control for electronic coils, chips, mechanical tools, and medical applications to maintain heat in direct printing devices, such as drums used in heat set printing machines. It may be used as a high temperature heat sink when the endothermic chemistry is a reduction reaction or decomposition. As such, it may also be used to prevent heat from escaping about the opening surrounding internal heating and plumbing piping as a protection against the spread of fire through said openings. In this application a high temperature reduction reaction might make use of a metal salt in a carbon matrix enclosed in a metal to prevent high temperatures from passing through an opening.

The conventional heating devices utilizing paraffin or wax PCM, of the same size, will dissipate its heat rapidly at the surface, quickly solidifying and forming a PCM skin near the surface. The solid PCM then acts as a thermal insulator reducing the devices ability to transfer heat exteriorly to the surface, trapping liquid hot spots inside the center of the device. This effect is most noticeable in food applications using conventional PCM's during the long, required heat-up of the device, particularly when metal outer housings are employed. When the operator tries to induce more rapid heating by using a very high heating temperature under these conditions the slow rate of internal thermal conductivity causes the hot liquid PCM to over heat in low melting temperature endothermic agents and usually results in thermal decomposition of the PCM. The decomposition results in a different and defective chemistry for the device resulting in a change in the operating temperature and effective thermal storage. Thus, a non-CFEM heating device using only conventional paraffin or wax PCM's has a limited effectiveness as a function of size, shape and surface area and could be dangerous if defective or abused.

Even, homogenous heating and steady state release of the latent heat of an endothermic agent are assured by use of the combination of fabric or other matrix and the endothermic agents of the present invention. In order to illustrate the ability and advantages of the present invention, several 15-inch diameter disks were formed under the present techniques. The examples employed a matrix of KEVLAR or silica batting and a polymeric endothermic agent. The following results were found.

Those pizza disks formed under the present invention did not develop surface skin or inner hot spots. Both the absorption of heat and its transfer to the surrounding environment (i.e. heat transfer hysteresis) are smooth and linear over an unexpectedly long period. Additionally, decomposition of the device is extremely low. Devices have been tested in operation in temperature ranges from 0° to 550° F., allowing, for example, food warmers to be safely heated in ovens at 500° F. or in boiling water. Repetitive heating and cooling appears to have no effect on the devices built in accord with the present invention. This is impossible with the conventional devices. Abusive over heating of a paraffin or hydrocarbon wax in a non-CFEM design represents a health hazard from toxic fumes and a potential explosive fire hazard when containers or disks rupture.

Enclosures in which the matrix is housed may be made of metal, plastic, glass, carbon and composite materials both rigid and dynamically amorphous (bags). Application of the inventive CFEM include food and food service, medical equipment, refrigeration, thermal storage, energy applications, chemical and process control, heat sink devices, clothing, camping gear, protective boxes for temperature sensitive goods, military, egg hatcheries, housing temperature control, fire prevention between floors and rooms where pipes and utility lines pass, underground heating for lawns, and thermal storage for solar and nuclear application.

Various modifications, changes, and embodiments have been disclosed, and others will be apparent to those skilled in the art. Therefore, it is intended that the foregoing disclosure be illustrated only and not limiting of the invention as claimed.

What is claimed is:

1. A device for maintaining the temperature of a heated body at an elevated level, comprising a rigid shape retaining shell having an open celled fibrous matrix uniformly filling the interior of said shell, said matrix having a selected polymeric endothermic agent dispersed throughout and retained within said matrix, said endothermic agent having a latent heat of fusion of at least 50 cal/gm at a selected heat of reaction and being capable of the controlled sustained absorption of heat when said device is subjected to a temperature above said heat of reaction and the controlled sustained radiation, conduction and convection of heat out of said device when the device is no longer subjected to a temperature above said heat of reaction and the device is in close proximity to the body whose heat is to be maintained, thereby maintaining the temperature of the body whose heat is to be maintained at an elevated level.

2. The device according to claim 1, wherein said endothermic agent has a heat of reaction between 135° and 326° F.

3. The device according to claim 1, wherein the endothermic agent is selected from the group consisting of polymers, homopolymers, oxidized polymers, oxidized homopolymers of ethylene compounds, carbon monoxide bonded copolymers, and micronized polyethylene waxes.

4. The device according to claim 1, wherein the open celled fibrous matrix is formed of filamentary material having a substantially increased surface area and capillary action.

5. The device according to claim 1, wherein the matrix is formed of material selected from the group consisting of a mesh of fibrous batting and wads of closely bound material and fibers; strips of metal and plastic; sheets of fabric, cloth, metal mesh, batting, fiberglass and fiber; particles of dust and powder; foams of carbon, silica, and metal and hollow particles; KEVLAR, fiber, clay, aluminum, copper, perforated metal foil, cellulose material, microspheres and ceramic.

6. The device according to claim 1, wherein said endothermic agent is chemically bound to said matrix.

7. The device according to claim 1, wherein said endothermic agent is adhered to the surface of said matrix.

8. The device according to claim 1, wherein said shell is formed as a container for food.

9. A device for maintaining the temperature of heated material at an elevated level, comprising a housing for the storage and transportation of the heated material, said housing having at least one wall formed as a rigid shape retaining shell in which is uniformly dispersed an open celled network matrix, said wall and matrix being formed of a substance having a temperature reaction above 500° F., a selected endothermic agent dispersed uniformly within and throughout said matrix and having a temperature of reaction below 500° F. and a latent heat of fusion of at least 80 cal/gm so that heat absorption and radiation, conduction and convection to and from said matrix is effected at temperatures at or below said temperature reaction of said endothermic agent without affecting the structure of said housing.

10. The device according to claim 9, wherein said at least one wall comprises a layer of fibrous network sandwiched between a pair of siding sheets.

11. The device according to claim 9, wherein said endothermic agent has a heat of reaction between 135° and 326° F.

12. The device according to claim 9, wherein the endothermic agent is selected from the group consisting of polymers, homopolymers, oxidized polymers, oxidized homopolymers of ethylene compounds, carbon monoxide bonded copolymers, and micronized polyethylene waxes.

13. The device according to claim 9, wherein the open celled fibrous network is formed of filamentary material having a substantially increased internal surface area and capillary action.

14. The device according to claim 13, wherein the open celled fibrous network is selected from the group consisting of a mesh, fibrous battings, wads of closely bound material or fibers; strips of clamped metal, plastic or sheets formed of fabric, cloth, metal, mesh, batting, fiberglass or fiber; dust particles or powder; carbon foam, silica foam, metal foam or hollow particles; KEVLAR, fiber, clay, aluminum, copper, perforated metal foils, cellulose material, and microspheres and ceramic.

15. The device according to claim 9, wherein said network is formed as a flexible sheet containing said endothermic agent sandwiched between fibrous materials.

16. The device according to claim 9, wherein the endothermic agent is selected to have a reaction at between 300°–450° F.

17. The device according to claim 1, wherein the open celled fibrous matrix is formed of particulate material providing increased surface area and capillary action.

18. The device according to claim 9, wherein the open celled fibrous matrix is formed of particulate material providing increased surface area and capillary action.

19. The device according to claim 1, wherein the endothermic agent is a polyethylene wax.

20. The device according to claim 9, wherein the endothermic agent is polyethylene wax.

* * * * *

UNITED STATES PATENT AND TRADEMARK OFFICE
CERTIFICATE OF CORRECTION

PATENT NO. : 5,709,914
DATED : January 20, 1998
INVENTOR(S) : Claude Q. C. Hayes It is certified that error appears in the above-identified patent and that said Letters Patent is hereby corrected as shown below:

Column 2, line 50: after "550°" insert --F--;

line 65: after "chemical reaction", delete "," and insert --and/or latent heat reactions such as--;

line 66: after "decomposition" insert --, change in--.

Column 4, line 8: after "KEVLAR" insert --and--.

Column 7, line 18: change "heat" (second occurrence) to --temperature--;

line 21: change "heat" to --temperature--;

line 24: change "heat" to --temperature--.

Column 8, line 18: change "heat" to --temperature--.

Signed and Sealed this

Fourth Day of August, 1998

*Attest:*

BRUCE LEHMAN

*Attesting Officer*    *Commissioner of Patents and Trademarks*